(12) United States Patent
Asghari-Kamrani et al.

(10) Patent No.: US 10,083,285 B2
(45) Date of Patent: *Sep. 25, 2018

(54) DIRECT AUTHENTICATION SYSTEM AND METHOD VIA TRUSTED AUTHENTICATORS

(71) Applicants: Nader Asghari-Kamrani, Centreville, VA (US); Kamran Asghari-Kamrani, Centreville, VA (US)

(72) Inventors: Nader Asghari-Kamrani, Centreville, VA (US); Kamran Asghari-Kamrani, Centreville, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/833,909

(22) Filed: Dec. 6, 2017

(65) Prior Publication Data

US 2018/0107811 A1    Apr. 19, 2018

Related U.S. Application Data

(63) Continuation of application No. 15/614,164, filed on Jun. 5, 2017, now Pat. No. 9,870,453, which is a
(Continued)

(51) Int. Cl.
*G06F 21/31* (2013.01)
*G06F 21/62* (2013.01)
(Continued)

(52) U.S. Cl.
CPC ......... *G06F 21/31* (2013.01); *G06F 21/6245* (2013.01); *G06Q 20/341* (2013.01); *G06Q 20/3823* (2013.01); *G06Q 20/4014* (2013.01); *G07F 7/1008* (2013.01); *H04L 63/0421* (2013.01); *H04L 63/062* (2013.01);
(Continued)

(58) Field of Classification Search
CPC ............... G06F 21/31; G06F 21/6245; G06F 2221/2115; G07F 7/1008; G06Q 20/341; G06Q 20/3823; G06Q 20/4014; H04L 63/0421; H04L 63/062; H04L 63/0807; H04L 63/0892; H04L 63/0838; H04L 2463/082

See application file for complete search history.

(56) References Cited

U.S. PATENT DOCUMENTS 4,747,050 A    5/1988    Brachtl et al.
4,885,778 A    12/1989    Weiss
(Continued)

FOREIGN PATENT DOCUMENTS

EP    0722241 A2    7/1996
EP    1077436 A2    2/2001
(Continued)

OTHER PUBLICATIONS

Lynn M. Lopucki, "Human Identification Theory and the Identity Theft Problem", Texas Law Review, vol. 80, 2001, pp. 89-134.
(Continued)

*Primary Examiner* — Amir Mehrmanesh
(74) *Attorney, Agent, or Firm* — MH2 Technology Law Group, LLP

(57) ABSTRACT

Systems and methods are provided for enabling online entities to determine whether a user is truly the person who he says using a "two-factor" authentication technique and authenticating customer's identity utilizing a trusted authenticator.

30 Claims, 4 Drawing Sheets

Related U.S. Application Data continuation of application No. 13/633,680, filed on Oct. 2, 2012, now Pat. No. 9,703,938, which is a continuation of application No. 11/333,400, filed on Jan. 18, 2006, now Pat. No. 8,281,129, which is a continuation-in-part of application No. 09/940,635, filed on Aug. 29, 2001, now Pat. No. 7,356,837, said application No. 13/633,680 is a continuation-in-part of application No. 13/606,538, filed on Sep. 7, 2012, now Pat. No. 9,727,864, which is a continuation of application No. 12/210,926, filed on Sep. 15, 2008, now Pat. No. 8,266,432, which is a continuation-in-part of application No. 11/239,046, filed on Sep. 30, 2005, now Pat. No. 7,444,676, which is a continuation-in-part of application No. 09/940,635, filed on Aug. 29, 2001, now Pat. No. 7,356,837, said application No. 12/210,926 is a continuation-in-part of application No. 11/333,400, filed on Jan. 18, 2006, now Pat. No. 8,281,129.

(60) Provisional application No. 60/650,137, filed on Feb. 7, 2005, provisional application No. 60/615,603, filed on Oct. 5, 2004.

(51) Int. Cl.
  *G06Q 20/34* (2012.01)
  *G06Q 20/38* (2012.01)
  *G06Q 20/40* (2012.01)
  *G07F 7/10* (2006.01)
  *H04L 29/06* (2006.01)

(52) U.S. Cl.
  CPC ...... *H04L 63/0807* (2013.01); *H04L 63/0892* (2013.01); *H05K 999/99* (2013.01); *G06F 2221/2115* (2013.01); *H04L 63/0838* (2013.01); *H04L 2463/082* (2013.01)

(56) References Cited

U.S. PATENT DOCUMENTS

| | | | |
|---|---|---|---|
| 4,965,568 A | 10/1990 | Atalla et al. |
| 5,363,449 A | 11/1994 | Bestock |
| 5,535,276 A | 7/1996 | Ganesan |
| 5,563,946 A | 10/1996 | Cooper |
| 5,592,553 A | 1/1997 | Guski et al. |
| 5,668,876 A | 9/1997 | Falk et al. |
| 5,732,137 A | 3/1998 | Aziz |
| 5,740,361 A | 4/1998 | Brown |
| 5,790,785 A | 8/1998 | Klug |
| 5,802,176 A | 9/1998 | Audebert |
| 5,815,665 A | 9/1998 | Teper et al. |
| 5,818,738 A | 10/1998 | Effing |
| 5,838,812 A | 11/1998 | Pare, Jr. et al. |
| 5,881,226 A | 3/1999 | Veneklase |
| 5,883,810 A | 3/1999 | Franklin et al. |
| 6,067,621 A | 5/2000 | Yu et al. |
| 6,078,908 A | 6/2000 | Schmitz |
| 6,233,565 B1 | 5/2001 | Lewis et al. |
| 6,236,981 B1 | 5/2001 | Hill |
| 6,300,873 B1 | 10/2001 | Kucharczyk et al. |
| 6,338,140 B1 | 1/2002 | Owens et al. |
| 6,529,885 B1 | 3/2003 | Johnson |
| 6,539,092 B1 | 3/2003 | Kocher |
| 6,678,666 B1 | 1/2004 | Boulware |
| 6,687,375 B1 | 2/2004 | Matyas, Jr. et al. |
| 6,715,082 B1 | 3/2004 | Chang et al. |
| 6,728,884 B1 | 4/2004 | Lim |
| 6,748,367 B1 | 6/2004 | Lee |
| 6,845,453 B2 | 1/2005 | Scheidt et al. |
| 6,901,387 B2 | 5/2005 | Wells et al. |
| 6,993,658 B1 | 1/2006 | Engberg et al. |
| 7,043,635 B1 | 5/2006 | Keech |
| 7,065,786 B2 | 6/2006 | Taguchi |
| 7,096,204 B1 | 8/2006 | Chen et al. |
| 7,111,173 B1 | 9/2006 | Scheidt |
| 7,150,038 B1 | 12/2006 | Samar |
| 7,171,694 B1 | 1/2007 | Jespersen et al. |
| 7,236,956 B1 | 6/2007 | Ogg et al. |
| 7,237,117 B2 | 6/2007 | Weiss |
| 7,324,972 B1 | 1/2008 | Oliver et al. |
| 7,334,735 B1 | 4/2008 | Antebi et al. |
| 7,353,541 B1 | 4/2008 | Ishibashi et al. |
| 7,356,837 B2 | 4/2008 | Asghari-Kamrani |
| 7,392,388 B2 | 6/2008 | Keech |
| 7,434,723 B1 | 10/2008 | White et al. |
| 7,444,676 B1 | 10/2008 | Asghari-Kamrani |
| 7,546,274 B2 | 6/2009 | Ingram et al. |
| 7,716,129 B1 | 5/2010 | Tan et al. |
| 7,822,666 B1 | 10/2010 | Bursch |
| 7,917,444 B1 | 3/2011 | Bursch |
| 7,949,603 B1 | 5/2011 | Cao et al. |
| 8,245,292 B2 | 8/2012 | Buer |
| 8,266,432 B2 | 9/2012 | Asghari-Kamrani |
| 8,281,129 B1 | 10/2012 | Asghari-Kamrani |
| 8,751,801 B2 | 6/2014 | Harris et al. |
| 2001/0032192 A1 | 10/2001 | Putta |
| 2001/0044787 A1 | 11/2001 | Shwartz et al. |
| 2001/0051924 A1 | 12/2001 | Uberti |
| 2002/0040346 A1 | 4/2002 | Kwan |
| 2002/0042781 A1 | 4/2002 | Kranzley |
| 2002/0046187 A1 | 4/2002 | Vargas et al. |
| 2002/0046189 A1 | 4/2002 | Morita et al. |
| 2002/0069174 A1 | 6/2002 | Fox et al. |
| 2002/0073046 A1 | 6/2002 | David |
| 2002/0083347 A1 | 6/2002 | Taguchi |
| 2002/0087483 A1 | 7/2002 | Harif |
| 2002/0095569 A1 | 7/2002 | Jerdonek |
| 2002/0120587 A1 | 8/2002 | D'Agostino |
| 2002/0123935 A1 | 9/2002 | Asghari-Kamrani et al. |
| 2002/0133412 A1 | 9/2002 | Oliver et al. |
| 2002/0184143 A1 | 12/2002 | Khater |
| 2002/0188481 A1 | 12/2002 | Berg et al. |
| 2003/0046237 A1 | 3/2003 | Uberi |
| 2003/0046571 A1 | 3/2003 | Nakayama |
| 2003/0074317 A1 | 4/2003 | Hofi |
| 2003/0080183 A1 | 5/2003 | Rajasekaran et al. |
| 2003/0172272 A1 | 9/2003 | Ehlers et al. |
| 2004/0030752 A1 | 2/2004 | Selgas et al. |
| 2004/0103287 A1 | 5/2004 | Newby |
| 2005/0010758 A1 | 1/2005 | Landrock et al. |
| 2005/0222963 A1 | 10/2005 | Johnson |
| 2006/0015725 A1 | 1/2006 | Voice et al. |
| 2006/0094403 A1 | 5/2006 | Norefors et al. |
| 2006/0278698 A1 | 12/2006 | Lovett |
| 2007/0016804 A1 | 1/2007 | Kemshall |
| 2007/0022301 A1 | 1/2007 | Nicholson et al. |
| 2007/0050840 A1 | 3/2007 | Grandcolas et al. |
| 2007/0073621 A1 | 3/2007 | Dulin et al. |
| 2007/0077916 A1 | 4/2007 | Saito |
| 2007/0107050 A1 | 5/2007 | Selvarajan |
| 2007/0130463 A1 | 6/2007 | Law et al. |
| 2007/0174904 A1 | 7/2007 | Park |
| 2008/0016003 A1 | 1/2008 | Hutchison et al. |
| 2008/0230614 A1 | 9/2008 | Boalt |
| 2010/0070757 A1 | 3/2010 | Martinez |
| 2010/0100724 A1 | 4/2010 | Kaliski, Jr. |
| 2013/0036053 A1 | 2/2013 | Asghari-Kamrani |
| 2014/0067675 A1 | 3/2014 | Leyva et al. |
| 2014/0372767 A1 | 12/2014 | Green et al. |

FOREIGN PATENT DOCUMENTS

| | | |
|---|---|---|
| EP | 1107089 A1 | 6/2001 |
| EP | 1445917 A2 | 8/2004 |
| GB | 2352861 A | 2/2001 |
| WO | 95/19593 A1 | 7/1995 |
| WO | 97/31306 A1 | 8/1997 |
| WO | 0002150 A1 | 1/2000 |

(56) References Cited

FOREIGN PATENT DOCUMENTS

| WO | 0072109 A2 | 11/2000 |
|---|---|---|
| WO | 01/99382 A2 | 12/2001 |

OTHER PUBLICATIONS

Daniel J. Solove, "Identity Theft, Privacy, and the Architechture of Vulnerability", Hastings Law Journal, vol. 54, vol. 4, 2003, pp. 1-47.

"Experts struggle to fight online 'phishing' schemes", 2006, Retrieved from the internet: http://mybroadband.co.za/nephp/2254.html, pp. 1-3.

"2-Factor Authentication: Will Financial Institutions Really be More Secure", 2006, Retrieved from the internet: http://www.prweb.com/releases/2006/02/prweb342996.htm, pp. 1-4.

Federal Financial Institutions Examination Council, "Authentication in an Internet Banking Environment", 2001, Retrieved from the internet: https://www.ffiec.gov/pdf/authentication_guidance.pdf, pp. 1-14.

PTO Non-Final Office Action dated May 8, 2013, U.S. Appl. No. 13/606,538, pp. 1-14.

PTO Final Office Action dated Mar. 21, 2014, U.S. Appl. No. 13/606,538, pp. 1-24.

PTO Non-Final Office Action dated Apr. 9, 2015, U.S. Appl. No. 13/606,538, pp. 1-8.

PTO Non-Final Office Action dated Sep. 2, 2015, U.S. Appl. No. 13/606,538, pp. 1-11.

PTO Non-Final Office Action dated Feb. 10, 2016, U.S. Appl. No. 13/606,538, pp. 1-12.

PTO Final Office Action dated Apr. 18, 2016, U.S. Appl. No. 13/606,538, pp. 1-14.

*Nader Asghari-Kamrani and Kamran Asghari-Kamrani vs. United Services Automobile Association*, Opinion and Order dated Jul. 5, 2016, pp. 1-13.

M. Myers et al., "X.509 Internet Public Key Infrastructure Online Certificate Status Protocol—OCSP", No. RFC 2560, 1999, pp. 1-23.

B. Clifford Neuman et al., "Kerberos: An Authentication Service for Computer Networks", IEEE Communications Magazine, vol. 32, No. 9, Sep. 1994, pp. 33-38.

*United Services Automobile Association v. Nader Asghari-Kamrani et al.*, Decision Denying Institution of Inter Partes Review, Feb. 26, 2016, U.S. Pat. No. 8,266,432, pp. 1-17.

Connectotel Limited (Applicant), "Strong Authentication Method Using a Telecommunications Device", Application No. GB9929291.4 lodged Dec. 11, 1999, pp. 1-12.

Marcus Williams, "Implementing Strong Passwords in an NDS Environment", Aug. 2000, Retrieved from the internet: http://support.novell.com/techcenter/articles/ana20000802.html, pp. 1-7.

Marcus Williams, "Policy-Based Management of Mobile Phones", Mar. 2001, Retrieved from the internet: http://support.novell.com/techcenter/articles/ana20010302.html, pp. 1-7.

Teppo Halonen, "Authentication and Authorization in Mobile Environment", In Tik-110.501 Seminar on Network Security, 2001, pp. 1-17.

*United Services Automobile Association* vs. *Nader Asghari-Kamrani and Kamran Asghari-Kamrani*, Case CBM2016-00064, Decision: Granting Institution of Covered Business Method Patent Review 37 C. F.R. § 42.208 dated Sep. 21, 2016, pp. 1-36.

*United Services Automobile Association* vs. *Nader Asghari-Kamrani and Kamran Asghari-Kamrani*, Case CBM2016-00063, Decision: Granting Institution of Covered Business Method Patent Review 37 C. F.R. § 42.208 dated Sep. 21, 2016, pp. 1-42.

*Nader Asghari-Kamrani and Kamran Asghari-Kamrani* vs. *United Services Automobile Association*, Case 2:15-cv-00478-RGD-LRL, USAA's First Amended Counterclaims to First Amended Complaint dated Mar. 29, 2016, pp. 1-18.

*Nader Asghari-Kamrani and Kamran Asghari-Kamrani* vs. *United Services Automobile Association*, Case 2:15-cv-00478-RGD-LRL, USAA's First Amended Counterclaims to Plaintiffs' Second Amended Complaint dated Oct. 4, 2016, pp. 1-35.

*Nader Asghari-Kamrani and Kamran Asghari-Kamrani* vs. *United Services Automobile Association*, Case 2:15-cv-00478-RGD-LRL, USAA's Answer and Counterclaims to Plaintiffs' Second Amended Complaint dated Apr. 28, 2016, pp. 1-28.

*Nader Asghari-Kamrani and Kamran Asghari-Kamrani* vs. *United Services Automobile Association*, Case 2:15-cv-00478-RGD-LRL, USAA's Answer and Counterclaims to First Amended Complaint dated Mar. 8, 2016, pp. 1-22.

PTO Notice of Allowance dated Apr. 3, 2017, U.S. Appl. No. 13/606,538, pp. 1-65.

R. Strack, "Challenges in Mobile Information Systems and Services." Retrieved from the Internet on Mar. 28, 2017: https://dialog.proquest.com/professional/docview/828562573?accountid=142257, pp. 1-2.

"New Version of Internet Access Software From Network TeleSystems Adds Support for Windows 95, Secure E-Mail, Multilink ISDN" Business Wire, Apr. 11, 1996. Retrieved from the Internet on Mar. 28, 2017, Accessible at https://www.thefreelibrary.com/New+Version+of+Internet+Access+Software+From+Network+TeleSystems+Adds...-a018179474, pp. 1-2.

Non-Final Office Action dated Aug. 30, 2017, U.S. Appl. No. 15/639,020, pp. 1-35.

*United Services Automobile Association* vs. *Nader Asghari-Kamrani and Kamran Asghari-Kamrani*, Case CBM2016-00063, Final Written Decision 35 U.S.C. § 328(a); 37 C.F.R. § 42.73 dated Aug. 15, 2017, pp. 1-67.

*United Services Automobile Association* vs. *Nader Asghari-Kamrani and Kamran Asghari-Kamrani*, Case CBM2016-00064, Final Written Decision 35 U.S.C. § 328(a); 37 C.F.R. § 42.73 dated Aug. 15, 2017, pp. 1-63.

PTO Final Office Action dated Feb. 7, 2018, U.S. Appl. No. 15/639,020, pp. 1-14.

PTO Final Office Action dated May 11, 2018, U.S. Appl. No. 15/639,020, pp. 1-29.

DIRECT AUTHENTICATION SYSTEM AND METHOD VIA TRUSTED AUTHENTICATORS

CROSS REFERENCE TO RELATED APPLICATIONS

This application is a continuation of U.S. patent application Ser. No. 15/614,164, filed Jun. 5, 2017, which is a continuation of U.S. patent application Ser. No. 13/633,680, filed Oct. 2, 2012, which is continuation of U.S. patent application Ser. No. 11/333,400 filed Jan. 18, 2006 (now U.S. Pat. No. 8,281,129), which is a continuation-in-part of U.S. patent application Ser. No. 09/940,635, filed Aug. 29, 2001 (now U.S. Pat. No. 7,356,837), and claims benefit of U.S. Provisional Application No 60/650,137, filed Feb. 7, 2005. U.S. patent application Ser. No. 13/633,680 is a continuation-in-part of U.S. patent application Ser. No. 13/606,538, filed Sep. 7, 2012, which is a continuation of U.S. patent application Ser. No. 12/210,926, filed Sep. 15, 2008 (now U.S. Pat. No. 8,266,432), which is a continuation-in-part of U.S. patent application Ser. No. 11/239,046, filed Sep. 30, 2005 (now U.S. Pat. No. 7,444,676), which is a continuation-in-part of U.S. patent application Ser. No. 09/940,635, filed Aug. 29, 2001 (now U.S. Pat. No. 7,356,837), and claims benefit of U.S. Provisional Patent Application No. 60/615,603 Oct. 5, 2004. U.S. patent application Ser. No. 12/210,926 is a continuation-in-part of U.S. patent application Ser. No. 11/333,400, filed Jan. 18, 2006 (now U.S. Pat. No. 8,281,129), which is a continuation-in-part of U.S. patent application Ser. No. 09/940,635, filed Aug. 29, 2001 (now U.S. Pat. No. 7,356,837). The contents of each of the above-identified applications is incorporated herein by reference in their entirety.

BACKGROUND OF THE INVENTION

Field of the Invention

The present invention generally relates to a direct authentication system and method, more particularly, to a new two-factor authentication method used by a business to authenticate its customers' identity utilizing trusted-authenticators.

Description of the Related Art

Fraud and Identity theft, the taking of a person's identity for the purpose of committing a criminal act, is a growing national concern, both in terms of its effect on its victims, and its potential national security implications. Checking account fraud costs US banks USD 698 million in 2002, according to the American Bankers' Association, while those perpetrating the fraud attempted to take USD 4.3 billion in total. Identity theft costs financial institutions USD 47.6 billion in 2002-2003. A report issued in September 2003 by the Federal Trade Commission estimates that almost 10 million Americans were victims of some type of identity theft within the previous year. Especially unnerving are the numerous accounts of the ordeals that victims endure as they attempt to deal with the results of this crime. They are assumed to be responsible for the debts incurred by the thief until they can demonstrate that they have been victims of fraud. They are targeted by collection agencies trying to collect on debts generated by thieves who open new accounts in their name. They have to deal with damaging information placed in their credit files as a result of the imposter's actions. It's well known how this can happen. Fraudulent charges may be posted to someone's checking account if the thief knows the account number and banks routing number. Identity thieves can "take over" an existing account and withdraw money, as well as change other account information such as mailing address, if the thief knows a few pieces of sensitive personal information, especially the account holder's Social Security Number (SSN). Perhaps worst of all, a thief can easily open a new account in someone else's name by completing an application for a new credit account, using the victim's name and SSN, but with a different address. The credit grantor, whether it be a retailer offering instant credit accounts via their website, a telecommunications company offering a new cell phone account, a bank offering a credit card, or an auto dealership offering a new car loan, uses the information provided by the thief to obtain a credit report on the person named in the account application. If the report indicates that the person named in the application is a good credit risk, a new account will likely be opened in the victim's name. But the victim never knows about the late and unpaid bills, until his credit is ruined.

Online Fraud happens because online businesses such as retailers assume that the person shopping online is the same person whose personal or financial information are given. Identity theft happens because creditors assume that the person filling the application is the same person whose name and personal information are used in the application, unless there is clear evidence to the contrary. A business "authenticates" a customer by matching personal and financial information provided, such as name, SSN, birth date, etc., with information contained in third party databases (indirect authentication). If there is a match on at least a few items of information, it is assumed that the person is the same person who he says he is. This assumption itself is a direct result of a belief that sensitive personal and financial information can be kept secret and out of the hands of thieves. Yet the widespread incidence of fraud and identity theft, as detailed by the personal stories of its many victims, clearly demonstrates that this notion is false. A recent paper by Prof. Daniel Solove ("Identity Theft, Privacy, and the Architecture of Vulnerability", Hastings Law Journal, Vol 54, No. 4 (2003), page 1251) of the Seton Hall Law School aptly points out that "The identity thief's ability to so easily access and use our personal and financial data stems from an architecture that does not provide adequate security to our personal and financial information and that does not afford us with a sufficient degree of participation in the collection, dissemination, and use of that information." He further goes on to say "The problem, however, runs deeper than the public disclosure of Social Security Numbers (SSN), personal and financial information. The problem stems not only from the government's creation of a de facto identifier and lax protection of it, but also from the private sector's inadequate security measures in handling personal information." "Further, identity thieves can obtain personal and financial information simply by paying a small fee to various database companies and obtaining a detailed dossier about their victims." There's only a certain amount that an individual can do to prevent sensitive information from getting into the wrong hands, such as keeping a tight grip on one's purse or wallet. Beyond that, the information is easily available to a thief in numerous other ways. It may be available through certain public records. It can be purchased from publicly available databases for a nominal fee. It can be copied from medical claims forms lying around in a doctor's office. Other methods include breaking into various commercial databases containing sensitive information about business's customers, many times with the help of an insider. As long as the authentication of new credit applications is based upon knowledge of a few items of personal information that are supposed to be confidential, the only way to truly prevent this type of identity theft is to keep one's personal information out of the hands of thieves, an impossible task. This is also true in the case of identity theft involving account takeovers, in which the thief uses knowledge of personal information about the victim to obtain information needed to take over someone's existing account.

There have been many attempts to solve above issues and concerns. One being the recent paper by Prof. Lynn LoPucki of the UCLA School of Law (www.ssrn.com/abstract=263213). The paper addresses many of these concerns, and suggests an approach to the identity theft problem that addresses the fundamental flaws in the process. This approach does not depend on keeping personal information secret, asking out-of-wallet questions, or computing fraud scores based on historical data and analytical fraud models. LoPucki's approach, which he calls the Public Identity System (PIDS), would establish a voluntary list of people concerned about identity theft, and who consent to be directly contacted for verification when someone applies for credit in their name. The list would be maintained by a government agency. An individual would voluntarily provide his/her personal information to the list, including name, SSN, and perhaps other identifying information. A thorough authentication process would ensure that new members of the list are truly the persons they claim to be. A personal appearance before the government agency that maintains the list would be required. Individuals participating in PIDS would specify one or more standardized ways that a creditor should contact them when the creditor has received a new account application in their name. Contact methods would likely be limited to a phone call, e-mail (encrypted or unencrypted), or US Mail. When a creditor receives a new account application, the creditor would consult the list to determine if the person named in the application, as identified by a SSN or other information, is a PIDS participant. If the named person is not a participant, the new account application would be processed in the usual manner. If, however, the named person is a PIDS participant, the creditor would contact the individual directly using one or more of the contact methods specified in the instructions provided by the individual.

A PIDS participant may even require, under some circumstances, a personal appearance before the creditor by anyone applying for a new account in his or her name. The reason for contacting the participant would be to verify that the participant is truly the person who submitted the new account application.

To significantly reduce identity theft using this approach, creditors would need to have an incentive to consult the list and follow the instructions given, and consumers would need to participate in PIDS in large numbers.

Although Prof. LoPucki's approach addresses the fundamental flaws in the credit granting process responsible for identity theft, it is time consuming for creditors to verify customer's identity. Also, some difficulties may arise with its implementation. The list of PIDS participants, together with their Social Security Numbers and contact information, would reside on a government website, and the information would be available to the public. This would only be implemented if the laws were changed to prevent knowledge of this information alone as providing "proof" of identity, as well as preventing other types of privacy invasions that might be enabled with public access to such information. Although the legal changes would make one's personal information much less useful to an identity thief, it is not clear how comfortable people would feel about an arrangement that allows their personal information to be made public in such an overt manner. In addition, PIDS participants would also need to personally appear before the government agency managing the list. These factors may inhibit many people from participating in PIDS. Since creditors would be required to directly contact individuals named in an account application if the person's name appears on the list, creditors may find this type of "direct authentication" process to be burdensome, especially if it involves more than a simple phone call or email. This may lead creditors to oppose PIDS. In addition, there is the question of how the creditor should authenticate the person taking the call, or responding to the email. How can the creditor be sure that the person taking the call, or responding to the email, is truly the person who joined PIDS, and who now should be queried about the credit application? Finally, the implementation of PIDS would seem to require the establishment of a new government bureaucracy to perform necessary functions such as establishing and maintaining the PIDS list, meeting with those individuals seeking to participate, verifying their identity credentials, and establishing the standardized methods by which creditors will contact and interact with PIDS participants. Of course, implementing any alternative to PIDS would also require a certain amount of up-front work to develop the necessary capabilities and infrastructures. And while it is not unreasonable for a government agency (such as a state motor vehicles bureau) to undertake at least some of these tasks, it is not clear whether any federal or state agencies would be ready and willing to fulfill the entire role.

Another possible solution has been suggested to modify Prof. LoPucki's approach (PIDS procedure) somewhat to take advantage of the existing trust relationships that individuals have already established with various organizations that they deal with. Rather than requiring creditors to authenticate applicants for new accounts by contacting them directly, these interactions could instead be performed by a "trusted authenticator." The trusted authenticator would be an entity that already knows the individual, maintains personal information about that individual, and has established a trusted relationship with that person. The advantage of using trusted authenticators is that the authentication process can be built on trust relationships and infrastructures already in place. A reasonable candidate for such a trusted authenticator would be a bank or other financial institution with whom the individual has already established an account. After all, if most people trust a bank to handle their money and keep it safe, trusting that same bank to authenticate their identities in other financial transactions should be natural. Prof. LoPucki's paper hints at such an arrangement in its discussion of how list members may choose to be contacted:

> The [e-mail] contact could be directly with the owner or through the owner's trusted intermediary. Instead of creating a new government bureaucracy to implement PIDS, the existing infrastructures and trust relationships within the financial services community could be enhanced to more efficiently derive the same benefits that PIDS provides.

In this modified authentication procedure, a list of all individuals who choose to participate (the "participants") would still be needed. The list would contain a name and SSN of each participant, together with the identity of their trusted authenticator. The list would be maintained by a new organization created by the financial services community specifically for this purpose, rather than by the government. However, the information on the list would not be accessible by the general public, but only by creditors and other members of the financial services community acting as trusted authenticators. The modified authentication procedure works as follows:

The creditor, upon receiving a new account application, checks the list to determine if the person named in the application is a participant. If so, the creditor queries the trusted authenticator designated on the list, and requests verification that the person named in the application is actually the person filing the new account application. If the person is not a participant, the creditor will process the application in the usual way.

Upon receiving a request from a creditor for direct authentication of a participant, who is also one of its customers, the trusted authenticator contacts its customer via a secure email message or phone call, as specified by the customer.

When communication is established, the trusted authenticator must first determine that it is actually communicating with its customer, and not someone else who has intercepted the email or phone call.

An email would contain a link that takes the customer to an authentication screen on the trusted authenticator's website. Here the customer would provide a password or Personal Identification Number (PIN) to authenticate himself/herself. The authentication process may also include an additional biometric factor such as a fingerprint or voiceprint. Most likely, the method of authentication used would be the same as the customer would use for online banking, which provides access to his/her banking accounts online.

A phone call would contain, at least, a request for the customer to provide a PIN or some other secret. A more secure authentication process might include an additional biometric factor, such as a voiceprint. Again, the method of authentication may be the same as the customer may use to perform telephone banking, which provides access to his/her banking accounts over the phone.

Once the trusted authenticator has verified the identity of its customer, the trusted authenticator asks its customer whether he/she has filed a specific application for credit, as indicated in the creditor's request for authentication.

If the customer responds affirmatively, the trusted authenticator replies to the creditor that the application appears to be authentic. If the customer responds negatively, the bank responds to the creditor that the application appears to be fraudulent.

The first problem with this solution is the fact that the trusted authenticator contacts its customer via an email message, which allows for phishing or brand spoofing. The customer could receive an email from a user falsely claiming to be the trusted authenticator in an attempt to scam the customer into surrendering private information that will be used for identity theft.

The second problem is the fact that a list of all individuals who choose to participate would still be needed. This will add to privacy and security concerns.

Another problem is the fact that this authentication method lacks the real-time authentication and therefore it is not suited for online transactions.

There have been many attempts to solve the online identification problems using tokens, smart cards or biometrics authentication methods, but these methods failed due to high cost and consumers' dissatisfactions:

Password Generation Tokens—creates custom passwords each time they are activated. The cost of each token makes this type of two-factor authentication method suited only for enterprise spaces and not to the consumer level outside of the enterprise. Another problem with this method is that the passwords are generated using an algorithm that is based on both a unique user ID and the current time, which makes the next generated password guessable. Another drawback of this authentication method is that a consumer has to manage different tokens for different relationships.

Biometrics—measure unique bodily characteristics such as fingerprint as a form of identification. Again, the cost of the devices makes this type of two-factor authentication method suited only for enterprise spaces. For privacy and security reasons, it's not suited to consumer level authentication where biometric images need to be stored and transmitted over a public network such as the Internet for authentication (opens to theft or interception).

Smart Cards and—store information on a tiny computer chip on the card. This type of two-factor authentication method requires a reader device and therefore makes it suited only for enterprise spaces. There have been many attempts to implement this method to the consumer level, but each time it failed because consumers find it difficult to use (Hooking up smart card readers to computer systems), costly and software dependent.

Smart Tokens—are technologically identical to the smart cards with the exception of their form factor and interface. Again, many attempts to implement this type of two-factor authentication method to the consumer level failed due to the same reasons: cost and consumer adoption (difficult to use and difficult to manage).

In view of the foregoing, a need exists for a new and improved direct authentication system and method via trusted-authenticators that validates customers' identity without the deficiencies and disadvantages of the prior arts, mainly the cost and consumer adoption. This new direct authentication system and method via trusted-authenticators will reduce the identity theft, fraud and customer privacy concerns, will be secure, easy to use and manage, will be inexpensive, will offer a high level assurance that an individual is who he/she claims he/she is, and will provide a real-time authentication solution that is suited for the consumer level authentication where real-time identity validation of the consumer is necessary.

SUMMARY OF THE INVENTION

Briefly described, the present invention relates to a direct authentication system and method via trusted-authenticators.

In this invention, direct authentication of an individual would be achieved via a new two-factor authentication method used by businesses to authenticate customers' identity utilizing trusted-authenticators. A trusted-authenticator would be an entity that already knows the individual, maintains information about that individual, and has established a trusted relationship with that individual. A reasonable candidate for such a trusted-authenticator would be bank or other financial institution with whom the individual has already established a relationship. In this invention, the financial services community will have a leading role in implementing stronger forms of authentication for identity theft and fraud prevention.

Experience shows that knowledge-based authentication, where individuals are recognized by demonstrating that they are in possession of information which only that individual would be expected to know, is an inexpensive, easy to use and easy to implement authentication method, where the authentication is between two entities such as a bank's customer and the bank. It relies on the secret information that is shared between these two entities. Therefore the underlying basis for this method is that only the real individual (bank's customer) would know such identifying information. But, when it comes to direct authentication to the consumer level, where the individual needs to authenticate his/her identity to any other entities with whom the individual does not have an existing relationship, such knowledge-based authentication will not work. Therefore, it's not secure to share the same secret information that the individual shares with one entity, with other entities for identification purposes. Such information is static and someone who happens to get access to such information could use it for authentication at other entities as well. Therefore, knowledge-based authentication is not secure for direct authentication of individuals.

To eliminate the risks associated with the static nature of the knowledge-based authentication, this invention suggests combining knowledge-based authentication with a dynamic key or information maintained by the trusted-authenticator to create a new two-factor authentication. This new two-factor authentication confirms individual identities using two different credentials:

a) Something the individual knows—This factor is a static key or information that the individual shares with his/her trusted-authenticator.
b) Something the individual receives—This factor refers to SecureCode which is a dynamic key or information that the individual requests and receives from his or her trusted-authenticator at the time of authentication through a communication network. It is important to note that the individual's dynamic key is an alphanumeric code and will have a different value each time the individual receives it from his/her trusted-authenticator for authentication purpose.

The strength of this new method of authentication occurs when combining two factors. This achieves a high level of assurance that an individual is who he/she claims he/she is and enhances security and reduces privacy concerns.

The direct authentication of an individual works as follows:

When an individual is on a business's site (offline or online), for successful direct authentication, the business requires the individual to provide his/her static and dynamic keys. The individual requests a dynamic key from his/her trusted-authenticator (using any communication network such as Internet or wireless) and provides it along with his/her static key to the business. When the business receives individual's static and dynamic keys, the business communicates authentication messages including individual's static and dynamic keys to the trusted-authenticator. The trusted-authenticator verifies individual's identity if both static and dynamic keys are valid, otherwise will send a denial authentication message back to the business over the same communication network.

DETAILED DESCRIPTION OF THE PREFERRED EMBODIMENTS

Figure 1A:
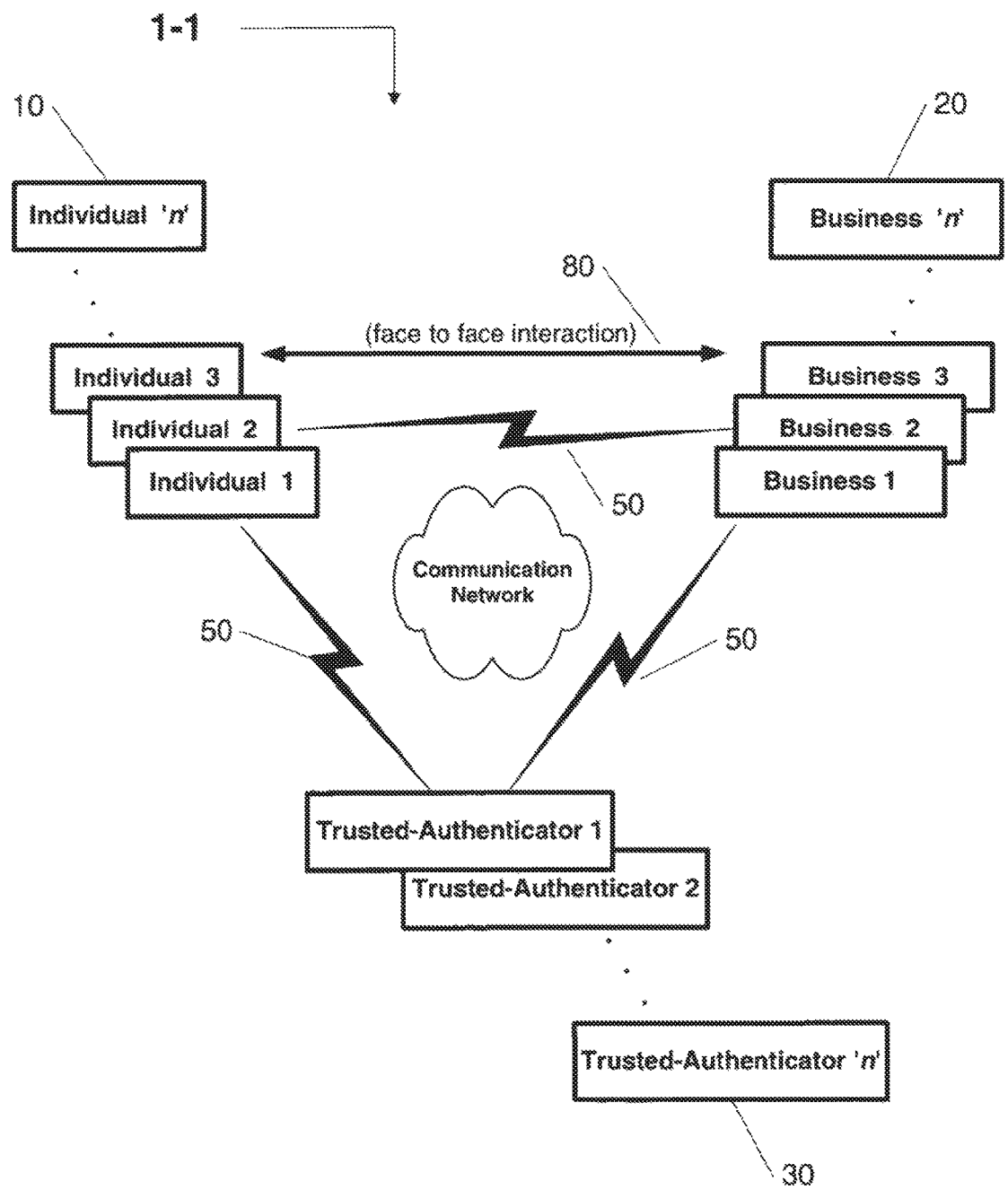
FIG. 1a is a high-level overview of a direct authentication system and method according to the present invention where the business directly contacts the individual's trusted-authenticator for validation of the individual's identity.

Detailed descriptions of the preferred embodiment are provided herein. It is to be understood, however, that the present invention may be embodied in various forms. Therefore, specific details disclosed herein are not to be interpreted as limiting, but rather as a basis for the claims and as a representative basis for teaching one skilled in the art to employ the present invention in virtually any appropriately detailed system, structure or manner.

Furthermore, as used herein, "individual" 10 broadly refers to a person, company or organization that has established a trusted relationship with a trusted-authenticator 30.

Furthermore, as used herein, "business" 20 broadly refers to a company or organization (online or offline) that has established a trusted relationship with a trusted-authenticator 40 and that needs to authenticate the identity of the individual 10.

The use of "trusted-authenticator" 30 refers to an entity that already knows the individual 10, maintains information about that individual 10, and has established a trusted relationship with that individual 10. A reasonable candidate for such a trusted-authenticator 30 would be a bank or other financial institution.

The use of "trusted-authenticator" 40 refers to an entity that already knows the business 20, maintains information about that business 20, and has established a trusted relationship with that business 20. A reasonable candidate for such a trusted-authenticator 40 would be a bank or other financial institution.

The use of "static key" refers to pre-shared information between both the individual 10 and individual's trusted-authenticator 30. The static key of an individual 10 is fixed information that does not change automatically and is used for authentication purposes. A static key might be any identification phrases such as password, name, UserName, SSN, alias, account number, customer number, etc or the combination of this information.

The use of "dynamic key" refers to SecureCode which is a key or information that is variable and is provided to the individual 10 by the individual's trusted-authenticator 30 at the time it is needed for authentication. The dynamic key is an alphanumeric code and will have a different value each time the individual 10 receives it from his/her trusted-authenticator 30 for authentication purposes. To increase security a dynamic key may have a non-repeating value, may be time dependent (valid for some period of time) and may be in an encrypted format.

The use of "communication network" 50 refers to any public or private network, wired or wireless (including cellular) network that exist between individuals 10, trusted-authenticators 30, 40 and businesses 20 for communication.

The use of "face-to-face communication" 80 refers to a situation when the "communication network" 50 is not required. Meaning that the individual 10 is physically at the location of the business 20 to communicate with the business.

The use of "authentication message" refers to a message that businesses 20, and trusted-authenticators 30, 40 send and receive to validate individual's identity. An authentication message may include individual's static and dynamic keys and any other information.

Figure 1B:
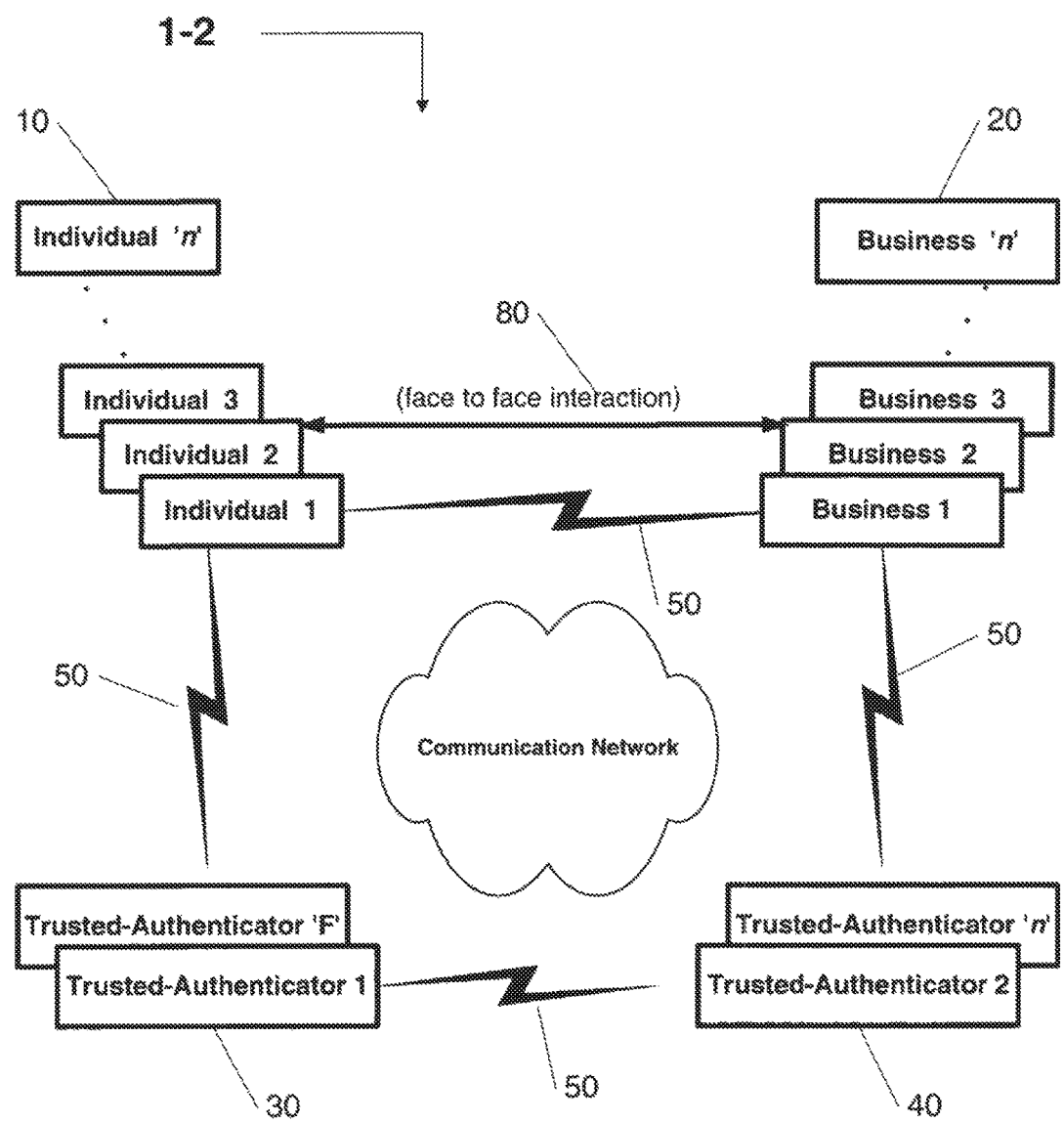
FIG. 1b is another high-level overview of a direct authentication system and method according to the present invention where the business contacts the individual's trusted-authenticator through its own trusted-authenticator to validate the individual's identity.

With reference to FIG. 1*a* and FIG. 1*b*, a direct authentication system 1-1, 1-2 in accordance with the present invention is illustrated. The system 1-1 in FIG. 1*a*, includes at least one individual 10, one individual's trusted-authenticator 30, one business 20 and communication network 50. The system 1-2 in FIG. 1*b*, includes at least one individual 10, one individual's trusted-authenticator 30, one business 20, one business's trusted-authenticator 40 and communication network 50.

The business 20 needs to authenticate the identity of the individual 10 utilizing either the individual's trusted-authenticator 30 or its own trusted-authenticator 40.

Specifically, when the business 20 desires to validate the individual's 10 identity, the individual 10 is required by the business 20 to provide his/her static and dynamic keys. A static key is something the individual 10 knows and is a shared secret between the individual and the individual's trusted-authenticator 30. A dynamic key refers to Secure-Code which is an alphanumeric code the individual 10 receives from his/her trusted-authenticator 30 at the time of authentication through a communication network 50. Each time an individual 10 receives a dynamic key from his/her trusted-authenticator 30, the dynamic key has a different value.

In accordance with the first embodiment of the present invention FIG. 1*a*, the business 20 might directly communicate authentication messages with the individual's trusted-authenticator 30 and request the individual's trusted-authenticator 30 to validate the individual's 10 identity. An example would be a creditor 20 who receives customer's 10 static and dynamic keys and directly communicates authentication messages with the customer's bank 30 to validate the customer's 10 identity.

In accordance with the second embodiment of the present invention FIG. 1*b*, the business 20 might communicate authentication messages with its own trusted-authenticator 40 and request its own trusted-authenticator 40 to validate the individual's 10 identity by communicating authentication messages with the individual's trusted-authenticator 30. An example would be an online merchant 20 who receives customer's 10 static and dynamic keys and communicates authentication messages with the merchant's bank 40. The merchant's bank 40 validates the customer's 10 identity by communicating authentication messages with the customer's bank 30.

Figure 2A:
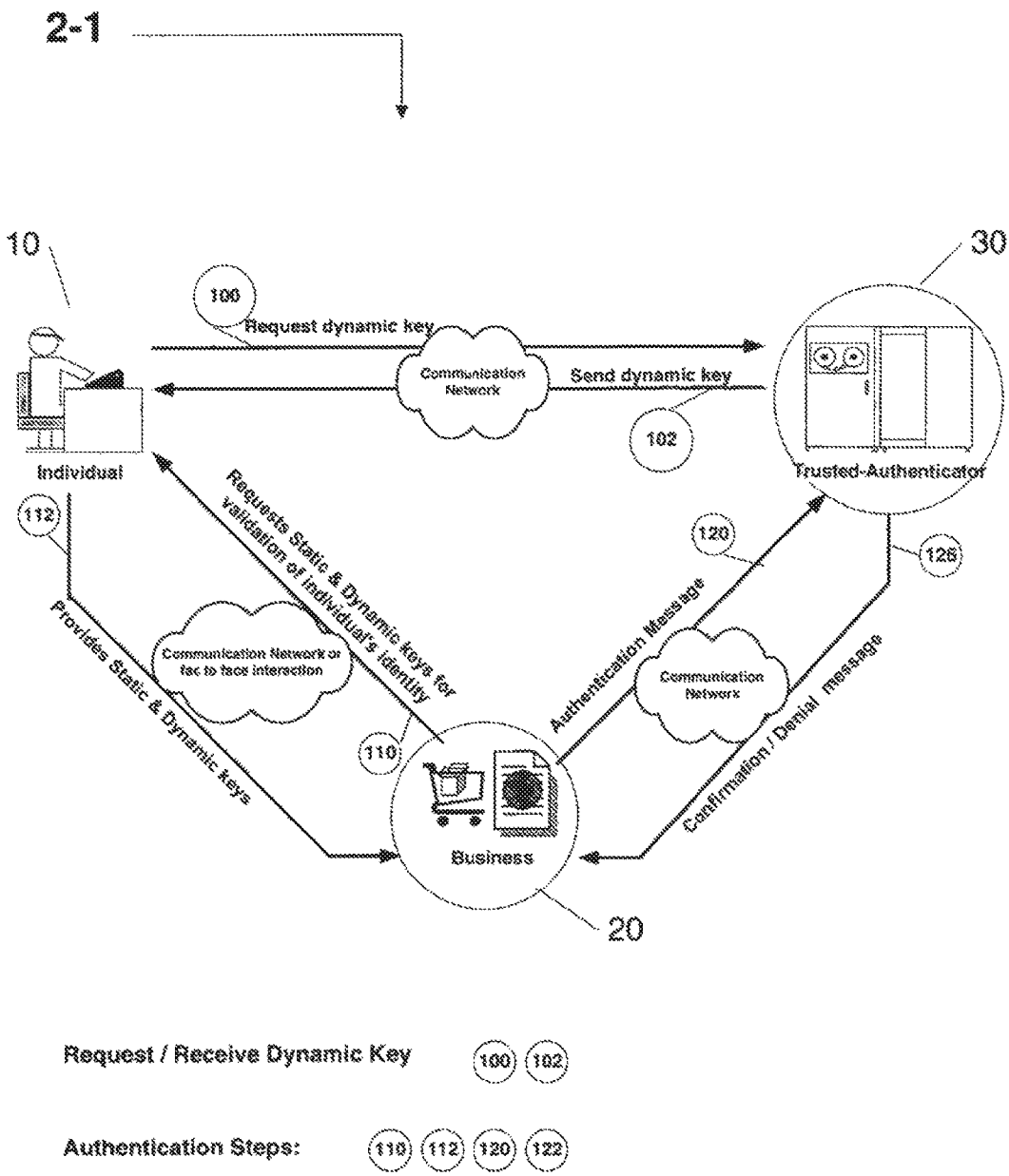
FIG. 2a illustrates the direct authentication system and method according to the present invention where the business directly contacts the individual's trusted-authenticator for validation of the individual's identity.

FIG. 2*a* illustrates the direct authentication method 2-1 in accordance with the first embodiment of the present invention. For two-factor authentication of an individual, the business 20 requests 110 the individual 10 to provide static and dynamic keys for validation of his/her identity. The individual 10 has already his/her static key (not shown). If the individual 10 does not own a valid dynamic key, the individual 10 requests it 100 from his/her trusted-authenticator 30 by communicating over a communication network 50.

In response to the individual's request 100, the trusted-authenticator 30 calculates and sends 102 a dynamic key to the individual 10 over a communication network 50. The trusted-authenticator 30 maintains both the static and dynamic keys in association with the authentication transaction.

Upon receipt of the dynamic key, the individual 10 provides the static key and the dynamic key to the business 20, 112 for validation of his/her 10 identity.

Upon receipt of the individual's 10 static and dynamic keys, the business 20 constructs an authentication message including the individual's 10 keys and communicates it to the trusted-authenticator 30, 120 for validation of the individual's 10 identity over a communication network 50.

Upon receipt of the authentication message, the trusted-authenticator 30 validates both keys and verifies the individual's 10 identity, and sends 126 either a confirmation message or a denial message back to the business over a communication network 50. The business 20 will receive 126 a confirmation message from the individual's trusted-authenticator 30 if both keys are valid. A confirmation message means that the individual 10 appears to be authentic and a denial message indicates that the individual's 10 identity has not been authenticated.

Upon receipt of a confirmation message from the individual's 10 trusted-authenticator 30, the business 20 will be certain that the individual 10 is who he/she 10 says he/she 10 is.

Figure 2B:
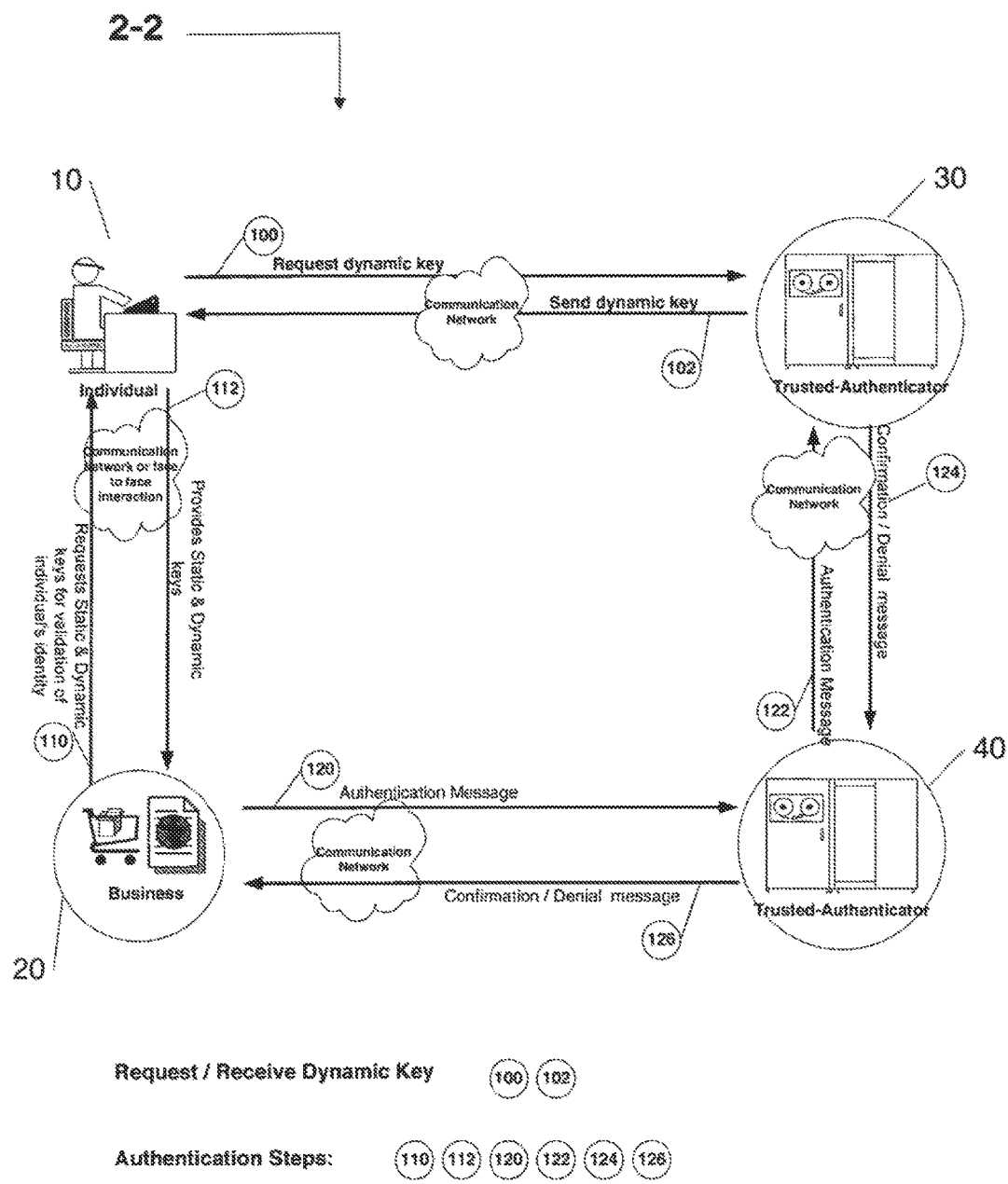
FIG. 2b illustrates the direct authentication system and method according to the present invention where the business contacts the individual's trusted-authenticator through its own trusted-authenticator to validate the individual's identity.

FIG. 2*b* illustrates the direct authentication method 2-2 in accordance with the second embodiment of the present invention. For two-factor authentication of an individual, the business 20 requests 110 the individual 10 to provide static and dynamic keys for validation of his/her identity. The individual 10 has already his/her static key (not shown). If the individual 10 does not own a valid dynamic key, the individual 10 requests it 100 from his/her trusted-authenticator 30 by communicating over a communication network 50.

In response to the individual's request 100, the trusted-authenticator 30 calculates and sends a dynamic key to the individual 10, 102 over a communication network 50. The trusted-authenticator 30 maintains both the static and dynamic keys in association with the authentication transaction.

Upon receipt of the dynamic key, the individual 10 provides the static key and the dynamic key to the business 20, 112 for validation of his/her 10 identity.

Upon receipt of the individual's 10 static and dynamic keys, the business 20 constructs an authentication message including the individual's 10 keys and communicates the authentication message 120 to its trusted-authenticator 40 for validation of the individual's 10 identity over a communications network 50.

Upon receipt of the authentication message, the business's trusted-authenticator 40 processes the request and forwards the authentication message to the individual's 10 trusted-authenticator 30, 122.

Upon receipt of the authentication message, the individual's trusted-authenticator 30 validates both keys and verifies the individual's 10 identity, and sends 124 either a confirmation message or a denial message back to the business's trusted-authenticator 40 over a communication network 50. The business's trusted-authenticator 40 will receive 124 a confirmation message from the individual's trusted-authenticator 30 if both keys are valid, otherwise, the business's trusted-authenticator 40 will receive 124 a denial message.

Upon receipt of a confirmation or denial message from the individual's trusted-authenticator 30, the business's trusted-authenticator 40 will process the message and will forward 126 the confirmation or denial message to the business 20.

A confirmation message means that the individual 10 appears to be authentic and a denial message indicates that the individual's 10 identity has not been authenticated.

Upon receipt of a confirmation, the business 20 will be certain that the individual 10 is who he/she 10 says he/she 10 is.

Although not shown specifically in FIG. 2a and FIG. 2b, it should be understood that one or more additional parties or entities may be introduced along the communication route within the scope of the present invention. Among other things, such additional parties may be useful for calculating and validating dynamic keys or expediting, screening, and correctly routing electronic communications between the various parties.

Benefits of the Present Invention

The security benefits of this invention are clear. The security provided by this new two-factor authentication method is the computer equivalent of the security provided by a safety deposit box: the individual's key alone can't open the safety box, and neither can the bank's key; both parties need to make use of both keys at the same time in order to open the safety box. Even if someone gets access to the individual's 10 static key, they cannot get authenticated as that individual 10 without the individual's 10 dynamic key (A key that the individual 10 receives from his/her trusted-authenticator 30 at the time of authentication). This is also true when, for authentication purposes, the individual 10 shares his/her static and dynamic keys with a business 20. If someone gets access to both keys, they still cannot use it for authentication at other businesses 20 because the dynamic key may expire the moment it gets used and it is no longer valid. Therefore, for authentication over the Internet, it will not matter whether a keystroke logger records what the individual 10 enters, because one of the keys is dynamic and may expire the moment the hacker gets it.

Comparing to other solutions, the present invention differs in several key advantages and offers many benefits:
  In general, the main advantage is the ability to validate individuals' identity for a large number of businesses.
  A very important advantage is that individuals' sensitive information is kept in a decentralized fashion among a large number of trusted-authenticators.
  Further advantage is the high security provided by a new two-factor authentication method.
  Another advantage is that it proofs that the individual is who he/she claims he/she is.
  Another advantage is that it prohibits individuals from falsely denying involvement in a transaction.
  Further advantage is that it enables businesses to validate individuals' identity in real time.
  Another advantage is that it utilizes a secure, inexpensive, easy to use and easy to manage authentication method that reduces the risk of fraud as well as identity theft, therefore offers a long-term security solution.
  Another advantage is that it handles the most difficult identification environment where the individual who is seeking identity verification is unknown to the business.
  Furthermore, It is responsive in any authentication environment, offline, domestically, internationally and electronically (online).

Those skilled in the art appreciate that authentication of individuals 10 may happen online or offline and therefore the communication between the individual 10 and the business 20 could happen either over a communication network 50 or face-to-face 80. In one embodiment the individual 10 may provide his/her static and dynamic keys to the business 20 over a communication network 50 such as the Internet or phone. In another embodiment the individual 10 may provide his/her static and dynamic keys to the business 20 in a face-to-face interaction with the business 20. An example would be when a car dealership needs to validate the individual's 10 identity. In this example, the individual 10 receives his/her dynamic key over a wireless communication network (wireless phone) and provides it along with his/her static key to the dealership for authentication of his/her identity.

Those skilled in the art also appreciate that a third party organization could act as a trusted-authenticator 30, 40. In one embodiment a trusted-authenticator 30, 40 may outsource the whole authentication process to a third party organization and in another embodiment a trusted-authenticator 30, 40 may outsource part of the authentication process to a third party organization.

Those skilled in the art also appreciate that one or more intermediaries may exist between a business 20 and a trusted-authenticator 30, 40.

Those skilled in the art also appreciate that for security reasons the individual 10 may receive his/her dynamic key in an encrypted format.

Those skilled in the art also appreciate that for convenience the transfer or communication 102, 112 of the individual's dynamic key from the individual's trusted-authenticator 30 to the business 20 could be done in an automated fashion through the individual's system to eliminate or minimize the involvement of the individual 10 or the interaction with the individual 10. For example, in an online authentication scenario, the individual's trusted-authenticator 30 might store the individual's dynamic key on the individual's system (e.g. as Cookie), which would be later accessed by the business 20 when the business 20 requires the individual 10 to provide his/her static key. Those skilled in the art will acknowledge that the options are unlimited.

Those skilled in the art also appreciate that the individual's trusted-authenticator 30 may invalidate the individual's dynamic key after its use and may also make the dynamic key time dependent by invalidating the key after a period of time. If an attacker gains access to the individual's static and dynamic keys, and the dynamic key is still valid, the damages that the individual 10 will receive will be limited only to one transaction, since the dynamic key gets invalidated after its use. But the individual will not receive any damages if the dynamic key has been invalidated.

Those skilled in the art appreciate that the present invention could be used to obtain authorization of financial transactions from individuals 10. A financial transaction is a payment or funds transfer transaction.

In view of the foregoing detailed description of preferred embodiments of the present invention, it readily will be understood by those persons skilled in the art that the present invention is susceptible of broad utility and application. While various aspects have been described in particular contexts of use, the aspects may be useful in other contexts as well. Many embodiments and adaptations of the present invention other than those herein described, as well as many variations, modifications, and equivalent arrangements, will be apparent from or reasonably suggested by the present invention and the foregoing description thereof, without departing from the substance or scope of the present invention. Furthermore, any sequence(s) and/or temporal order of steps of various processes described and claimed herein are those considered to be the best mode contemplated for carrying out the present invention. It should also be understood that, although steps of various processes may be shown and described as being in a preferred sequence or temporal order, the steps of any such processes are not limited to being carried out in any particular sequence or order, absent a specific indication of such to achieve a particular intended result. In most cases, the steps of such processes may be carried out in various different sequences and orders, while still falling within the scope of the present inventions. Accordingly, while the present invention has been described herein in detail in relation to preferred embodiments, it is to be understood that this disclosure is only illustrative and exemplary of the present invention and is made merely for purposes of providing a full and enabling disclosure of the invention. The foregoing disclosure is not intended nor is to be construed to limit the present invention or otherwise to exclude any such other embodiments, adaptations, variations, modifications and equivalent arrangements.

We claim:

1. A method of enhancing authentication of a user attempting to access an online system via a computer network, the method comprising:
   receiving by the online system, via the computer network, user-authentication information including a user-authentication code provided by an authentication system to the user via the computer network after an attempt by the user to access information of the online system, wherein:
      the user-authentication code is information generated by the authentication system for authenticating the user,
      the user-authentication code is configured to be valid for a predetermined time,
      the user-authentication code is configured to become invalid after the predetermined time, and
      the user-authentication code is configured to become invalid after a first use to authenticate the user;
   providing by the online system, via the computer network, a user-authentication request to the authentication system, wherein the user-authentication request includes the user-authentication code and user-identification information of the user;
   receiving by the online system, via the computer network, a response to the user-authentication request indicating whether the authentication system authenticated the user, wherein:
      the user is authenticated using the user-authentication code and the user-identification information included in the authentication request,
      the response to the user-authentication request confirms authentication of the user if the user-authentication code is valid, and
      the response to the user-authentication request denies authentication of the user if the user-authentication code is invalid; and
   providing by the online system, via the computer network, the user access to the information of the online system.

2. The method of claim 1, wherein the user-authentication code is a SecureCode.

3. The method of claim 2, wherein the SecureCode is comprised of alphabetic characters.

4. The method of claim 2, wherein the SecureCode is a Personal Identification Number (PIN).

5. The method of claim 2, wherein the SecureCode is comprised of numeric characters.

6. The method of claim 2, wherein the online system is an online site.

7. The method of claim 1, wherein the information of the online system comprises a restricted web site.

8. The method of claim 1, wherein the information of the online system comprises online account information.

9. The method of claim 1, wherein, after providing the user device with the access, the user-authentication code is invalid for all subsequent attempts to access information of the online system.

10. The method of claim 1, wherein online system is an online site.

11. The method of claim 1, wherein the user-authentication code is comprised of alphanumeric characters.

12. The method of claim 1, wherein the authentication system sends the user-authentication code to the user via a private network or a public network.

13. The method of claim 1, wherein the user-authentication code is variable and has different value each time the user receives it.

14. The method of claim 1, wherein the computer network is a private network or a public network.

15. The method of claim 1, wherein the user-authentication code includes different, non-repeating values each time the user receives it.

16. A system for enhancing authentication of a user attempting to access an online system via a computer network, the system comprising one or more computing devices configured to perform operations comprising:
   receiving by the online system, via the computer network, user-authentication information including a user-authentication code provided by an authentication system to the user via the computer network after an attempt by the user to access information of the online system, wherein:
      the user-authentication code is information generated by the authentication system for authenticating the user,
      the user-authentication code is configured to be valid for a predetermined time,
      the user-authentication code is configured to become invalid after the predetermined time, and
      the user-authentication code is configured to become invalid after a first use to authenticate the user;
   providing by the online system, via the computer network, a user-authentication request to the authentication system, wherein the user-authentication request includes the user-authentication code and user-identification information of the user;
   receiving by the online system, via the computer network, a response to the user-authentication request indicating whether the authentication system authenticated the user, wherein:
      the user is authenticated using the user-authentication code and the user-identification information included in the authentication request,
      the response to the user-authentication request confirms authentication of the user if the user-authentication code is valid, and
      the response to the user-authentication request denies authentication of the user if the user-authentication code is invalid; and
   providing by the online system, via the computer network, the user access to the information of the online system.

17. The system of claim 16, wherein the user-authentication code is a SecureCode.

18. The system of claim 17, wherein the SecureCode is comprised of alphabetic characters.

19. The system of claim 17, wherein the SecureCode is a Personal Identification Number (PIN).

20. The system of claim 17, wherein the SecureCode is comprised of numeric characters.

21. The system of claim 16, wherein the information of the online system comprises a restricted web site.

22. The system of claim 16, wherein the information of the online system comprises an online account of the user.

23. The system of claim 16, wherein, after providing the user device with the access, the user-authentication code is invalid for all subsequent attempts to access information of the online system.

24. The system of claim 16, wherein the user-authentication code is comprised of alphanumeric characters.

25. The system of claim 16, wherein the computer network is a private network or a public network.

26. The system of claim 16, wherein the authentication system sends the user-authentication code to the user via a private network or a public network.

27. The system of claim 16, wherein the user-authentication code is variable and has different value each time the user receives it.

28. The system of claim 16, wherein the user-authentication code is provided to the user from the authentication system via the computer network.

29. The system of claim 16, wherein the online system is an online site.

30. The system of claim 16, wherein the user-authentication code includes different, non-repeating values each time the user receives it.

\* \* \* \* \*